(12) United States Patent
Arsenault

(10) Patent No.: US 6,421,433 B1
(45) Date of Patent: Jul. 16, 2002

(54) INTERACTIVE VOICE PERSONAL AND LIVE CONNECTION TELEPHONE MESSAGING SYSTEM

(75) Inventor: Steven J. Arsenault, Vancouver (CA)

(73) Assignee: SA Interactive Information Technology, Inc., Vancouver (CA)

( * ) Notice: Subject to any disclaimer, the term of this patent is extended or adjusted under 35 U.S.C. 154(b) by 0 days.

(21) Appl. No.: 09/743,252

(22) PCT Filed: Dec. 24, 1999

(86) PCT No.: PCT/CA99/01128
§ 371 (c)(1),
(2), (4) Date: Apr. 11, 2001

(87) PCT Pub. No.: WO00/31950
PCT Pub. Date: Jun. 2, 2000

Related U.S. Application Data
(60) Provisional application No. 60/110,042, filed on Nov. 25, 1998.

(51) Int. Cl.[7] .............................................. H04M 15/00
(52) U.S. Cl. .............................. 379/114.19; 379/114.13; 379/121.05
(58) Field of Search ........................ 379/114.19, 114.13, 379/121.05; 705/14; 455/414

(56) References Cited

U.S. PATENT DOCUMENTS

| | | | | |
|---|---|---|---|---|
| 5,058,152 A | * | 10/1991 | Solomon et al. | |
| 5,768,348 A | * | 6/1998 | Solomon et al. | |
| 5,818,836 A | * | 10/1998 | DuVal | |
| 6,125,178 A | * | 9/2000 | Walker et al. | |
| 6,282,515 B1 | * | 8/2001 | Speicher | |

* cited by examiner

*Primary Examiner*—Duc Nguyen
*Assistant Examiner*—Barry W Taylor
(74) *Attorney, Agent, or Firm*—Seed Intellectual Property Law Group PLLC

(57) ABSTRACT

In existing "voice personal" ads, users are not charged for "browsing" the voice mail messages on the system. Consequently, a large percentage of users of the telephone lines required for such a system are using the system free of charge by merely browsing, which causes an uneconomic use of the majority of the lines. "Live connection systems" can charge for time on the system but require more expensive equipment and monitoring than a basic "voice personals" system, and so most newspapers utilize only the standard "voice personals" arrangement. There is therefore a need to increase the revenue of such voice personals systems by encouraging users to switch to a "live connection system". The present invention provides a method of interconnecting a "voice personal system" and a "live connection system" which would alert the voice personals "browser" of the presence of potential live connections and transfer the browser to the live connection system.

10 Claims, 2 Drawing Sheets

INTERACTIVE VOICE PERSONAL AND LIVE CONNECTION TELEPHONE MESSAGING SYSTEM

This application is a 371 of PCT/CA99/01128, filed Dec. 24, 1999, which claims benefit of U.S. application 60/110,042, filed Nov. 25, 1998.

TECHNICAL FIELD

The invention relates to telephone voice personal advertisements and telephone dating services.

BACKGROUND ART

Traditional "personals" or "lonely hearts" columns in newspapers involve the publication of an anonymous advertisement, identified with a box number. A reader interested in contacting the advertiser mails a letter which is forwarded by the newspaper to the advertiser. With the advent of voice mail, these "personals" columns have become more immediate and effective through what are referred to as "voice personals". The advertiser, in addition to a published ad, leaves a voice mail recording which is accessed through a central phone number by entering the advertiser's box number. The interested party can then listen to the voice message and leave a voice mail message in reply. Generally, such systems charge the users (by credit card or through use of a 1-900 number) to publish an advertisement or record or reply to voice mail messages, but do not charge for "browsing" the voice mail messages on the system. Consequently, a large percentage of users of the telephone lines required for such a system are using the system free of charge by merely browsing, which causes an uneconomic use of the majority of the lines. Another problem with such systems is that the person who responds to an ad must lose his or her anonymity by leaving a telephone number or address to contact. This increases the reluctance of users to respond to the ads.

A development which overcomes some of these difficulties is a telephone meeting service of the type referred to by the trade-mark "Chatline". According to this system, referred to herein as a "live connection system", callers record a greeting when entering the system, and then browse through the greetings of other callers presently on the system. If a caller wishes to make a live connection with a party associated with a particular recorded greeting, then a request is made through the system, and if the target party consents to the connection after listening to the callers greeting, a live connection is made. Callers are charged by the minute to credit card or through use of a 1-900 number. This system has the advantage that all parties remain anonymous, and the system can charge customers for all the time they spend on the system. See also Solomon et al. U.S. Pat. Nos. 4,878,239, 4,847,890, 5,058,152 and 5,361,295 which describe similar telephone systems which permit anonymous meeting.

"Live connection systems" require more expensive equipment and monitoring than a basic "voice personals" system, and so most newspapers utilize only the standard "voice personals" arrangement. There is therefore a need to increase the revenue of such voice personals systems by encouraging users to switch to a "live connection system".

DISCLOSURE OF INVENTION

The present invention therefore provides a method of interconnecting a "voice personal system" and a "live connection system" which would alert the voice personals "browser" of the presence of potential live connections and transfer the browser to the live connection system. The user of the "live connection system" similarly can be switched to the voice personals system to leave a temporary mailbox.

BRIEF DESCRIPTION OF DRAWINGS

In drawings which disclose a preferred embodiment of the invention.

BEST MODE(S) FOR CARRYING OUT THE INVENTION

Figure 1:
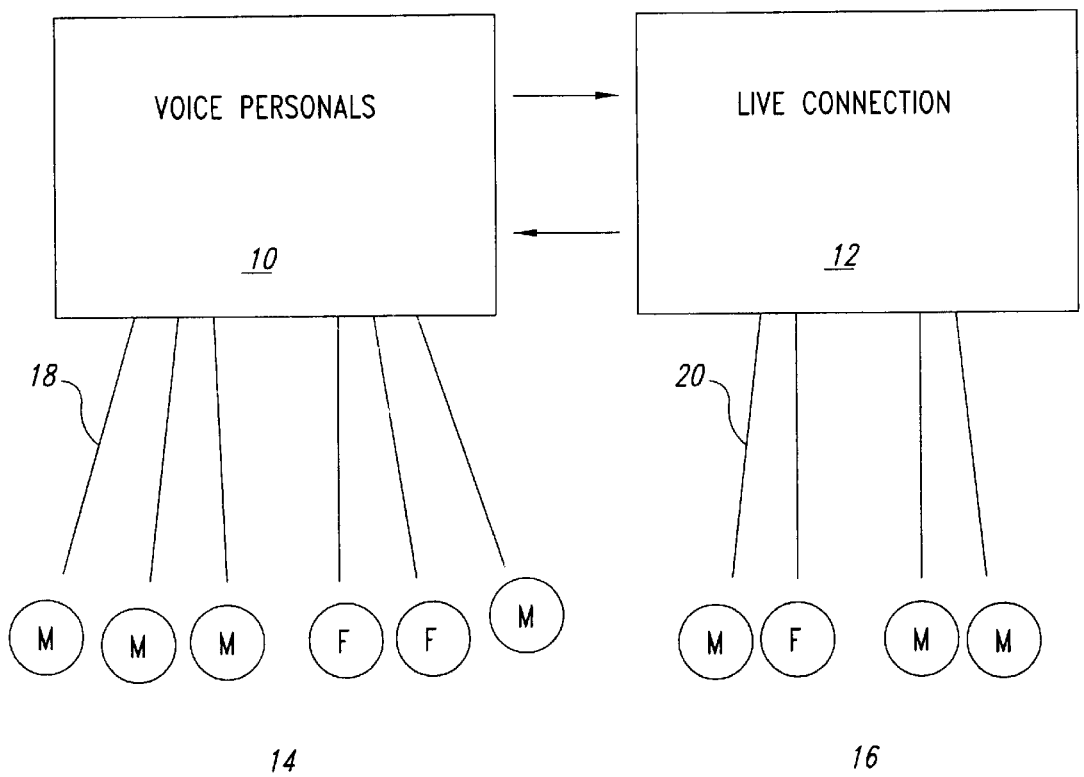
FIG. 1 is a schematic diagram illustrating the invention.
Figure 2:
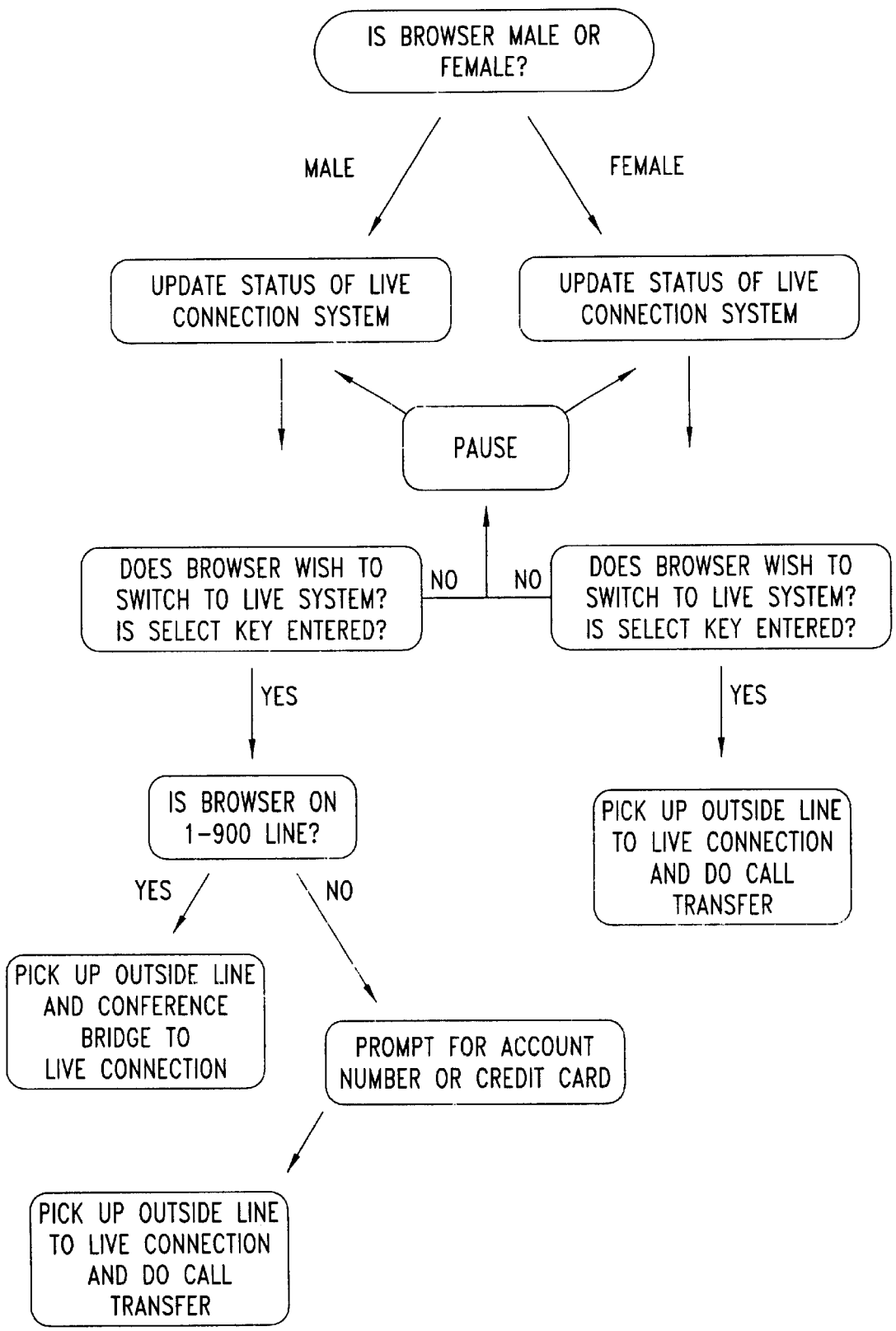
FIG. 2 is a block diagram illustrating the method of the invention.

A voice personals telephone system 10 has a number of users 14, some of whom are male (designated "M") and some of whom are female (designated "F") actively browsing voice mail messages or advertisements on its voice mail storage at any given time. The voice personals system 10 has identified whether a given caller is male or female. Simultaneously, a live connection system 12 is operating with a number of male and female users 16 making live anonymous connections over telephone lines 20. Each browser 14 occupies a telephone access line 18 to the voice personals system. At various points during the browser's activities, the browser is alerted by an updated recorded voice message of the existence of the live connection system 12, and the number of users currently on the live connection system 12. For female browsers, the woman is notified of the number of male users on the live connection system, and in some cases the fact that entry into the live connection system is free for females. For male browsers, the man is notified of the number of female users on the live connection system and the cost of entering the live connection system. This could be done at an appropriate time when the browser is being prompted to select an ad to browse, or when picking up messages from a voice mail box, or when completing the recording of an ad. The browser is invited to switch to the live connection system by touching a particular key. For example, a recorded message would prompt the browser "If you wish to transfer to the "live one-on-one" line, press '8'". Also, a browser is alerted by a recorded message when browsing an ad of a person on the voice personals system that that person is currently on the live connection system, if that is the case, and is invited to switch to the live connection system by touching a telephone key.

If the option to switch is selected, and the browser is female, the call is transferred to the live connection system 12 without charge. The voice personals system picks up an outside line, dials the live connection system and enables a call transfer through the Centrex system. The Centrex system of the public telephone system picks up an outside line and causes the female browser's call to be transferred from the voice personals line to the live connection system line by a Centrex transfer and the initial line is dropped. This frees up an incoming line to the voice personals system 10. The voice personals system provides information over modem to the live connection system to identify the source and sex of the caller. In areas where Centrex is not available, the call would be transferred by the telephone exchange of the voice personals system 10, although this would not result in the freeing-up of a line. Upon entering the live connection system, the female browser then becomes treated as any other female user on the live connection system.

If the option to switch is selected, and the browser is male, the browser is prompted to provide his account number for the live connection system, and if he has no account, his credit card information is taken. The call is then transferred to the live connection system 12 as in the case of a female, except that the male user is billed for time on the live connection system. Alternatively, if the male browser is communicating with the voice personals system over a 1-900 pay number, the call is transferred to the live connection system by a conference bridge so that the billing remains on the same 1-900 number. In the event that the same software for both voice personals and chat systems resides on the same computer system, the 1-900 call simply continues until complete without call transfer.

Information concerning the number of users and identity of the users on the live connection system is transferred to the voice personal system computer either by direct connection via network or modem connection, or via a TCIP connection on the Internet. In either case a program constantly updates the voice personals system of the status of the live connection system.

Conversely, callers 16 using the live connection system 12 may be invited to set up a temporary mail box on the voice personals system, to increase their chances of attracting an appropriate live connection. If such option is selected, the caller 16 is transferred to the voice personal system to complete a temporary voice mail message, following which the caller is prompted to transfer back to the live connection system. Callers may also leave live messages as to the date and time they may be available for other callers to speak to them live.

Where reference is made herein to "telephone system" such should be read as either the conventional centrally switched public telephone system, or an Internet-based telephone system, or a combination of both. For example users of the disclosed system may make voice communications over the Internet as well as conventional telephone lines.

Both the voice personals and live connection system software may be resident on the same computer, in which case the transfers may be done internally without using the telephone system or Centrex or other means.

In some cases, a caller may wish to request a connection with another user of the voice personals via the live connection system but only on a one-to-one basis. In that event, the caller would listen to a voice personals message and be alerted that the person they had just listened to is available for live "one-on-one chatting" via the system, and to the time and date at which the person is available to accept calls, for example, Monday to Friday from 7 p.m. to 8 p.m. The receiving caller would already have incorporated this information into the voice personals message. The caller would then dial the system at the appropriate time. The system calls the receiving caller and tells the receiving caller of a potential chat caller on one line. After listening to a short message greeting which had just been recorded by the caller, the receiving party has the opportunity to accept that call or reject the call by pressing a key on his or her touchtone telephone. The call is terminated after a period of time following a recorded message alerting the caller and receiving party that the call has been limited to a certain length of time.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of inter-connecting a telephone voice personals system and a telephone live connection system, comprising:

a) providing a voice personals telephone system having a number of users, some of whom are male and some of whom are female, actively browsing voice mail messages;

b) identifying whether a given user is male or female;

c) providing a live connection system operating with a number of male and female users making live anonymous connections;

d) periodically alerting a browser of the existence and status of the live connection system and inviting the browser to elect to switch to the live connection system;

e) if the browser elects to switch and the browser is female, transferring the call to the live connection system;

f) if the browser elects to switch and the browser is male, prompting the browser to provide his account number for the live connection system, and if he has no account, obtaining his credit card information and then transferring the call to the live connection system, or conferencing the call to the live connection system if the browser has called on a time charging telephone line.

2. The method of claim 1 wherein the status information provided to the browser is the number of users currently on the live connection system.

3. The method of claim 2 wherein the status information provided to the browser is, for female browsers, the number of male users on the live connection system.

4. The method of claim 2 wherein the status information provided to the browser is, for male browsers, the number of female users on the live connection system.

5. The method of claim 1 wherein said election is made by touching a particular telephone numeric key.

6. The method of claim 1 further comprising a step that a browser is alerted by a recorded message when browsing an ad of a person on the voice personals system that that person is currently on the live connection system, if that is the case, and inviting the browser to elect to switch to the live connection system.

7. The method of claim 1 wherein a call is transferred by the voice personals system picking up an outside line, dialling the live connection system and enabling a call transfer through the Centrex system.

8. The method of claim 1 further comprising a step that the voice personals system provides information over modem to the live connection system to identify the source and sex of the transferring browser.

9. The method of claim 1 further comprising a step that the live connection system provides information over modem to the voice personals system concerning the number of users and identity of the users on the live connection system to update the voice personals system of the status of the live connection system.

10. The method of claim 1 further comprising a step that users of the live connection system are prompted to set up a temporary mail box on the voice personals system to increase their chances of attracting an appropriate live connection, and the user is transferred to the voice personal system to complete a temporary voice mail message, following which the caller is prompted to transfer back to the live connection system.

* * * * *

UNITED STATES PATENT AND TRADEMARK OFFICE
CERTIFICATE OF CORRECTION

PATENT NO.      : 6,421,433 B1
DATED           : July 16, 2002
INVENTOR(S)     : Steven J. Arsenault It is certified that error appears in the above-identified patent and that said Letters Patent is hereby corrected as shown below:

<u>Title page,</u>
Item [22], PCT Filed, "December 24, 1999" should read -- November 24, 1999 --.

<u>Column 4,</u>
Line 21, "obtaining his credit card information and then" should be corrected to read -- obtaining his credit card information, and then --.

Signed and Sealed this

First Day of April, 2003

JAMES E. ROGAN
*Director of the United States Patent and Trademark Office*